United States Patent
Akahira et al.

[11] Patent Number: 5,811,217
[45] Date of Patent: Sep. 22, 1998

[54] OPTICAL INFORMATION RECORDING MEDIUM AND OPTICAL INFORMATION RECORDING/REPRODUCING METHOD

[75] Inventors: Nobuo Akahira, Yawata; Kenichi Nagata, Mino; Eiji Ohno, Hirakata; Kenichi Nishiuchi, Moriguchi; Noboru Yamada, Hirakata, all of Japan

[73] Assignee: Matsushita Electric Industrial Co., Ltd., Osaka, Japan

[21] Appl. No.: 257,470

[22] Filed: Jun. 9, 1994

Related U.S. Application Data

[63] Continuation of Ser. No. 918,959, Jul. 24, 1992, abandoned.

[30] Foreign Application Priority Data

Jul. 24, 1991 [JP] Japan ................................ 3-184528

[51] Int. Cl.$^6$ .................................................. G11B 7/00
[52] U.S. Cl. ................ 430/270.13; 430/945; 430/19; 430/271.1; 369/288; 369/283; 369/284
[58] Field of Search ................................ 430/271, 275, 430/495, 19, 945, 271.1, 275.1, 270.13, 270.12; 369/288, 283, 284, 275.2; 346/135.1

[56] References Cited

U.S. PATENT DOCUMENTS

| | | | |
|---|---|---|---|
| 3,665,483 | 5/1972 | Becker et al. | 346/135.1 |
| 3,696,344 | 10/1972 | Feinlieb et al. | 369/275.2 |
| 4,451,914 | 5/1984 | LaBudde et al. | 346/135.1 |
| 4,670,345 | 6/1987 | Morimoto et al. | 346/135.1 |
| 4,900,598 | 2/1990 | Suzuki | 430/495 |
| 5,024,910 | 6/1991 | Ohta et al. | 430/19 |
| 5,107,482 | 4/1992 | Goto et al. | 369/275.2 |
| 5,151,295 | 9/1992 | Kawahara et al. | 427/12 |
| 5,171,618 | 12/1992 | Suzuki et al. | 346/135.1 |
| 5,191,565 | 3/1993 | Inoue et al. | 369/284 |
| 5,194,363 | 3/1993 | Yoshioka et al. | 346/135.1 |
| 5,194,636 | 3/1993 | Yoshioka et al. | 346/135.1 |
| 5,233,599 | 8/1993 | Ohno et al. | 369/288 |
| 5,249,175 | 9/1993 | Akahira et al. | 369/275.1 |
| 5,255,260 | 10/1993 | Yamada et al. | 369/283 |
| 5,272,667 | 12/1993 | Yamada et al. | 369/13 |
| 5,294,523 | 3/1994 | Nagata et al. | 430/19 |
| 5,352,551 | 10/1994 | Mizuguchi et al. | 430/445 |
| 5,484,686 | 1/1996 | Maeda et al. | 430/270.13 |

FOREIGN PATENT DOCUMENTS 3-12824  1/1991  Japan ................................ 369/284

OTHER PUBLICATIONS

Ohda et al. "Phaze Change Disk Medium Having Rapid Cooling Structure" Jap. J. Appl. Phys. 28 pp. 123–128 (1989).

Primary Examiner—Martin Angebranndt
Attorney, Agent, or Firm—Ratner & Prestia

[57] ABSTRACT

An optical information recording medium, which includes a substrate, and a recording thin film layer provided on the base material and adapted to form variation in an amount optically detectable by absorbing at least laser light so as to record information by partially varying the recording thin film layer and to reproduce the information by optically detecting the variation amount. The optical information recording medium further includes transparent layers each provided in contact with the recording thin film layer, and each of the transparent layers has optical thickness in which, in at least two different wavelengths $\lambda$, integral multiple of $\lambda/2$ is added to the thickness giving the large laser light absorption and large optical variation amount, respectively.

More specifically, the optically detectable amount is of a reflectance factor variation, and in the different wavelengths $\lambda 1$ and $\lambda 2$, with respect to the thicknesses d1 and d2 of the transparent layers which give the optical characteristic more than 60% in the absorption, and more than 20% in the reflectance factor variation, the thickness of each transparent layer is arranged to be the thickness d having relation as represented by a following equation.

$$d = d1 + (\lambda_1/2) \times m = d2 + (\lambda_2/2) \times l \quad (m, l: \text{positive integer or zero}).$$

9 Claims, 3 Drawing Sheets

OPTICAL INFORMATION RECORDING MEDIUM AND OPTICAL INFORMATION RECORDING/REPRODUCING METHOD

This application is a continuation of application Ser. No. 07/918,959 filed Jul. 24, 1992, now abandoned.

BACKGROUND OF THE INVENTION

The present invention generally relates to an optical information recording and reproducing, and more particularly, to an optical information recording medium adapted to record information at high density on a thin film through employment of energy rays such as light rays, heat energy, etc., and to reproduce the information by detecting optical variations, and a method for effecting such recording and reproducing of the optical information.

Generally, when laser light is converged by a lens system, a small light spot having a diameter on the order of its wavelength can be obtained. Therefore, it is possible to produce a light spot having a high energy density per unit area even by a light source of a small output. Through employment of such light spot, very small regions of a substance may be varied, and the variation of such very small regions can also be detected. The utilization of the above fact for the recording and reproducing of information is represented by an optical information recording medium, which will be referred to as an "optical recording medium" or merely as a "recording medium" hereinafter.

The optical recording medium as stated above fundamentally includes a base material having a flat surface, and a recording thin film layer in which some state thereof is varied by the projection of laser spot light thereonto. For the recording and reproducing of the signal, a practice as follows may be employed. Specifically, a flat plate-like medium is moved by a rotary means or translation means, for example, of a motor or the like, thereby to converge a laser light onto the recording thin film surface on said medium for irradiation. In this case, it is a common practice to effect a focusing control so that the laser light may be converged on the recording thin film surface. The recording thin film is raised in its temperature by absorbing laser light. When the output of the laser light is increased above a certain threshold value according to the information to be recorded, the state of the recording thin film is partially varied and thus, the information is recorded thereon. The threshold value as referred to above is the amount depending on a thermal characteristic of the substrate, a relative speed of the medium with respect to the light spot, etc., besides the characteristic of the recording thin film itself. The recorded information is reproduced by projecting a light spot having an output sufficiently lower than said threshold value, onto the recorded portion, and detecting that some optical characteristics such as a transmission light intensity, reflection light intensity or directions of polarization thereof, etc. are different between the recorded portion and the non-recorded portion. In the above case, it is a common practice to effect a tracking control so that the laser light accurately follows a series of states of the portion varied by the recording. Meanwhile, there is also adapted a practice in which some guide for tracking is provided for example, by preliminarily forming concave and convex grooves on the base material, and through utilization thereof, recording and reproducing are effected while the tracking control is being carried out.

As examples for actual applications of such optical recording mediums referred to above, there are available optical recording discs for video image files, document files, and external memory for a computer (data files), etc. Moreover, optical recording mediums in the form of cards or tapes are also proposed.

With respect to the forms or modes of recording and the recording medium materials to be employed therefor, various types such as ablative recording type, and magneto-optical recording type, etc., have been proposed, among which there is provided a recording medium called a "phase-change type" utilizing the change of a crystalline structure, and effecting optical change without accompanying variations in shape.

The phase-change recording medium as referred to above has some advantages as compared with the recording mediums of other types. One of such advantages is that, since the recording is effected only by the laser light projection, it is not required to apply an external magnetic field as in the magneto-optical recording medium, thus the recording device being simplified. Another advantage is such that, owing to the fact that reflectance of the recording thin film is varied, the signal is reproduced through detection of the variation in the reflecting light amount, with a consequent larger amount of signal as compared with the magneto-optical recording medium in which the polarizing direction of light is detected, thus providing the signal having a favorable SN ratio. Furthermore, since the phase-change recording medium is not accompanied with the change of shape, it is possible to erase the recorded information by reversibly varying through between a plurality of states, thereby to record fresh signals for providing a rewriting function. Moreover, owing to the absence of the change in shape, a protective layer can be formed by closely contacting coating, and thus, a complicated hollow structure called "an air-sandwich structure" as in the ablative recording is not required, and thus, the recording medium simple in construction can be provided at high reliability.

The characteristics of the phase-change medium as described above may be attributable to the fact that optical constant of the material, and more specifically, complex index of refraction (complex number having refractive index as a real part and extinction coefficient as an imaginary part) is varied by the phase-change. Therefore, even in the mediums other than the phase-change recording medium, similar characteristics may be expected also in the recording medium having the recording mechanism in which the optical constant is varied. For examples of the recording mediums as referred to above, there have been proposed, e.g. a recording medium utilizing a photochromic phenomenon of an organic material, and a recording medium which may be called "an alloyed recording medium" in which the optical constant is substantially varied through formation of a thin film composed of a plurality of material layers into a molten alloy (disclosed, for example, in "Proceedings of SPIE", Vol. 529, pages 76 to 82 (1985).

As materials to be employed for the phase-change recording medium, there are available an amorphous chalcogenide thin film (disclosed in a magazine "Appl. Phys. Let." Vol 18, pages 254 to 256 (1971)), and an oxide group thin film mainly composed of $Te\text{-}TeO_2$ including tellurium and tellurium oxide (disclosed in U.S. Pat. No. 3,971,874). Similarly, a thin film mainly composed of $Te\text{-}TeO_2\text{-}Pd$ is also known (disclosed in U.S. Pat. No. 4,624,914).

In the above recording mediums, the recording is effected by changing either one of the extinction coefficient or refractive index of the thin film through irradiation of the laser light, while the signal is reproduced by detecting that the amplitude of the transmission light or reflection light is varied at the above portion, and consequently, the transmission light amount or reflection light amount to the detecting system is varied thereby.

Since the medium of the phase-change type is not accompanied by the variation of the shape as described earlier, if it is possible to change the state reversibly, the recorded signal may be erased or rewritten. As materials capable of reversibly changing phase as described above, there have been known Ge-Te-Sb-S group material (disclosed in U.S. Pat. No. 3,530,441), Te-O-Ge-Sb group material (disclosed in U.S. Pat. No. 4,935,336), Te-O-Ge-Sb-Au group material (disclosed in U.S. Pat. No. 4,656,079), and Ge-Sb-Te group material (disclosed in Japanese Patent Laid-Open Publication Tokkaisho No. 62-209742), etc.

In each of the materials referred to above, there are stably present the amorphous state (or glass state) and crystalline state as reversibly changing two states. Generally, the recording and reproducing are realized by methods as described below. Specifically, the amorphous state is realized by melting a thin film through heating and temperature rise by irradiation of laser light thereto, and rapidly quenching in the process of cooling after completion of the laser light irradiation. Meanwhile, the crystallization is realized similarly by heating the thin film through laser light irradiation, up to a temperature sufficient to effect crystallization below the melting point. Moreover, even when the temperature is raised above the melting point, crystallization is also realized in the case where slow cooling is effected, since sufficient quenching condition could not be achieved during cooling.

The thin film material to be used for the phase-change recording medium is generally amorphous in the state as deposited, and in the write once type, it is a normal practice to use the amorphous state for the unrecorded state, and the crystalline state for the recorded state. Meanwhile, in the erasable type, the amorphous state is generally used as the recording state, although the amorphous state and crystalline state may be respectively used as the recording state and the erasing state of the information or conversely, as the erase state and recorded state as desired.

Incidentally, the laser conventionally used for recording has been mainly of the laser diode, with wavelengths in the vicinity of 800 nm. In recent years, by the development of the laser diode technique, laser diode having shorter wavelengths in the order of 600 nm has been put into practical application. Furthermore, employment of a short wavelength laser using a secondary harmonic wave generating element, and a short wavelength laser light utilizing gas laser, etc. has also been under study. By using the laser light having short wavelengths, it becomes possible to converge the light spot into a still smaller diameter in proportion to the wavelength, thus making it possible to improve the recording density. Moreover, reduction of the laser power required for the recording, i.e. substantial improvement of sensitivity can also be expected. Additionally, it will be advantageous to users, if a recording medium with an interchangeability for use both in the conventional long wavelength laser light and the new short wavelength laser light becomes available.

However, since the optical recording medium generally employs an optically multi-layer structure, it is normally designed to meet a specific wavelength. In the phase-change type recording medium also, the optical optimization as described above is effected, and therefore, the characteristics thereof may be obtained only for the laser light of the specific wavelength, and thus, it is not possible to obtain the recording medium which can be used in the laser light with a plurality of different wavelengths.

SUMMARY OF THE INVENTION

Accordingly, an essential object of the present invention is to provide an optical information recording medium which is capable of effecting both or either one of recording and reproducing in laser light of a plurality of different wavelengths.

Another object of the present invention is to provide an optical information recording/reproducing method which effects recording and reproducing by laser light of different wavelengths.

In accomplishing these and other objects, according to one preferred embodiment of the present invention, there is provided an optical information recording medium which includes a substrate, and a recording thin film layer provided on said substrate and adapted to form variation in an amount optically detectable by absorbing at least laser light so as to record information by partially varying said recording thin film layer and to reproduce the information by optically detecting the variation amount.

The optical information recording medium further includes a transparent layer means provided in contact with said recording thin film layer, and the transparent layer means has optical thickness in which, in at least two different wavelengths $\lambda$, integral multiple of $\lambda/2$ are added to the thickness giving the large laser light absorption and large optical variation amount, respectively.

More specifically, the optically detectable amount is of a reflectance factor variation, and in the different wavelengths $\lambda 1$ and $\lambda 2$, with respect to the thicknesses d1 and d2 of said transparent layer means which gives the optical characteristic more than 60% in the absorption, and more than 20% in the reflectance factor variation, the thickness of said transparent layer means being arranged to be the thickness d having relation as represented by a following equation (1).

$$d=d1+(\lambda 1/2)\times m=d2+(\lambda 2/2)\times 1 \quad (m, l: positive\ integer\ or\ zero) \qquad (1)$$

By employing the construction as described above, favorable optical characteristics may be obtained even with respect to the different wavelengths, and thus, it becomes possible to effect recording and reproducing by the laser light of different wavelengths. In the optical characteristic for the wavelength $\lambda$ of a transparent thin film, i.e., thin film without absorption, the equivalent characteristic can be obtained at a cycle of $\lambda/2$. Therefore, by adopting the construction most suitable for the different wavelengths $\lambda 1$ and $\lambda 2$, i.e. by setting the thickness to d so as to obtain the relation of the equation (1) in the thickness of the transparent layer means with respect to the thicknesses d1 and d2 of the transparent layers having the construction with the large laser light absorption and also, large reflectance factor variation, the characteristic equivalent to the thickness d1 can be obtained with respect to the wavelength $\lambda 1$, while the characteristic equivalent to d2 may be obtained for the wavelength $\lambda 2$. Therefore, the construction best suitable for both of the wavelength $\lambda 1$ and $\lambda 2$ is provided.

According to the present invention, it is possible to provide the optical recording medium capable of recording and/or reproducing in a plurality of laser light with different wavelengths. Moreover, the method of effecting recording and reproducing by the laser light of different wavelengths can also be provided.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
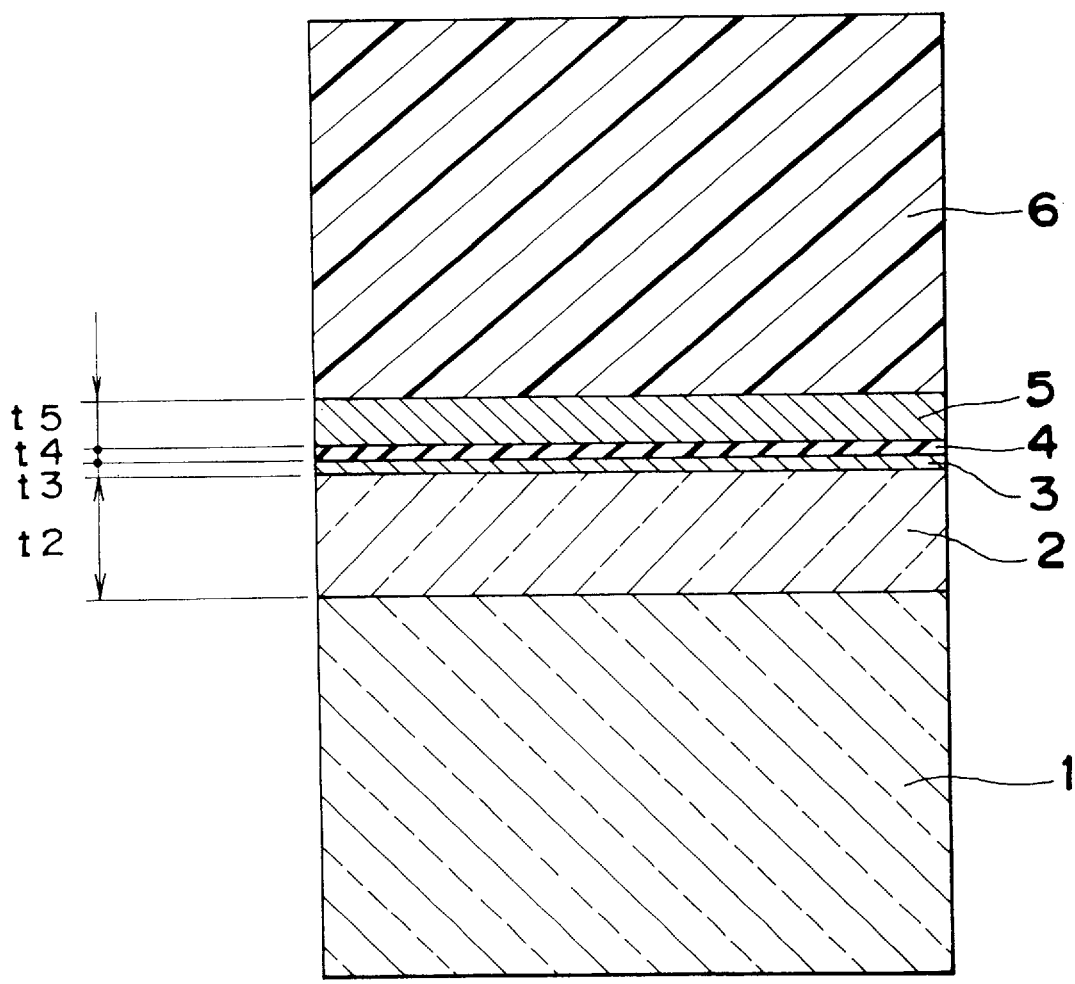
FIG. 1 is schematic cross section showing a general construction of an optical information recording medium according to one preferred embodiment of the present invention.

Before the description of the present invention proceeds, it is to be noted that like parts are designated by like reference numerals throughout the accompanying drawings.

Referring now to the drawings, there is shown in FIG. 1, an optical information recording medium according to one preferred embodiment of the present invention, which generally includes a substrate 1, a first transparent layer 2 of a transparent dielectric material or the like provided on the substrate 1, a recording thin film layer 3 formed on said first transparent layer 2, a second transparent layer 4 also of a dielectric material and the like provided on the recording thin film layer 3 and a reflection layer 5 provided on the second transparent layer 4, with a transparent protective material 6 being further provided thereon in close contact with said reflection layer 5. It is to be noted here that the protective material 6 may be dispensed with depending on a situation, in which case air (with a refractive index 1.0) which is optically equivalent is considered to provide the same effect. For the first transparent layer 2 to have an optical function, it is preferable to employ material different in the refractive index from that of the substrate 1.

There are generally three reasons for employing the construction as shown in FIG. 1. One reason is such that, by holding the recording thin film layer 3 between the transparent layers 2 and 4, it is intended to prevent mechanical deformation by maintaining the configuration of the recording thin film layer 3 when the recording is to be effected by forming the recording thin film layer 3 into the amorphous state through melting and quenching. Another reason is to obtain the optical effect which may increase the reproducing signal amount by enlarging the reflection factor variation between the amorphous state and crystalline state through increase of absorption of laser light to the recording thin film layer 3. A third reason is to control the thermal conditions necessary for forming the recording thin layer 3 into the amorphous state and crystalline state. Particularly, there has also been known the construction to obtain the conditions in which the heat of the recording thin film layer easily escapes into the metallic reflection layer 5 (rapid quenching condition) by making the transparent layer 4 thin, especially to obtain the quenching conditions required for the amorphous state formation.

In FIG. 1, by properly selecting the thickness t3 of the recording thin film layer 3, thickness t2 and t4 of the transparent layers 2 and 4, and the thicknesses t5 of the reflection layer 5, the optical characteristic with respect to the laser light wavelength to be used may be determined. However, since the material to be used for the reflection layer 5 has a small transmittance, the optical characteristic does not depend too much on the film thickness in the thickness having the reflecting function. Therefore, for the practical application, the thicknesses of the recording thin film layer 3, and the transparent films 2 and 4 are to be selected.

For the substrate 1, a transparent and smooth flat plate of glass, resin, or the like is employed. Moreover, there may be formed groove-like concave and convex portions for tracking guide on the surface of the substrate 1.

Meanwhile, for the protective material 6, a material in which resin is dissolved in a solvent and then, dried, or resin plates are bonded by a bonding agent, etc. may be employed.

For the recording thin film material to be used for the recording thin film layer 3, materials which effect phase-change between the amorphous state and crystalline state, for example, chalcogen compounds such as SbTe group, In Te group, GeTeSn group, SbSe group, TeSeSb group, SnTeSe group, In Se group, TeGeSnO group, TeGeSnAu group, TeGeSnSb group, and TeGeSb group, etc. may be employed. Oxide group materials such as Te-$TeO_2$ group, Te-$TeO_2$-Au group, and Te-$TeO_2$-Pd group, etc. can also be used. Moreover, metallic compounds such as AgZn group and InSb group, etc. which effect phase-change between crystalline states can similarly be employed.

As the transparent layer 2, oxides such as $SiO_2$, SiO, $TiO_2$, MgO, and $GeO_2$, etc., nitrides such as $Si_3N_4$, Bn, AlN, etc., chalcogenide such as Zns, ZnSe, ZnTe, PbS, etc., or mixtures thereof can be utilized.

For the reflection layer 5, materials mainly composed of metals such as Au, Al, and Cu, etc., or dielectric multi-layer films having a large reflectance factor at a specific wavelength can be adopted.

Such thin film layers as described above may be formed through employment of a vacuum deposition method employing polyphyletic evaporation sources, and a sputtering method using composite targets in a mosaic structure, etc.

For the recording thin film layer 3, a ternary compound of germanium, antimony and tellurium having a composition of $Ge_2Sb_2Te_5$ as a phase-change material is used. As a method of formation, an electron beam deposition method using three evaporating sources of Ge, Sb and Te is utilized. The recording thin film layer 3 is formed in the amorphous state. In the amorphous state with only $Ge_2Sb_2Te_5$ of the above composition as deposited on a quartz glass plate, optical constants at respective wavelengths (complex refractive indexes) are measured, and the material is further heat-treated at 300° C. for five minutes in an inert atmosphere to be formed into a crystalline state (annealed state), and the optical constants at the respective wavelengths are similarly measured, the results of which are shown in Table 1 below.

TABLE 1

| (Optical constants of $Ge_2Sb_2Te_5$) | | |
|---|---|---|
| Wavelength (nm) | n + ki (amorphous) | n + ki (crystal) |
| 830 | 4.5 + 1.3i | 5.6 + 4.0i |
| 650 | 4.4 + 1.5i | 4.6 + 4.1i |
| 400 | 3.5 + 2.2i | 4.4 + 2.3i |

As the substrate, a polycarbonate resin plate of 1.2 mm thick and 200 mm in diameter (PC, refractive index: 1.58 at wavelength of 830 nm: the same values hereinafter) preliminarily formed with groove tracks of 0.6 μm wide and 65 nm deep was prepared, and on this base material, a mixed dielectric material of zinc sulfide and silicon dioxide (ZnS—SiO2, mole ratio 4:1) is deposited to t2 in thickness by the electron beam deposition method as the transparent layer 2. On the transparent layer 2, a recording thin film $Ge_2Sb_2Te_5$ was formed to t3 in thickness by the similar method as above for the recording thin layer 3, with ZnS—$SiO_2$ being further deposited thereon by the similar method to t4 in thickness as the transparent layer 4. On the transparent layer 4; aluminum (Al) is formed by an electron beam deposition method to a thickness of t5 as the reflection layer 5. Furthermore, a polycarbonate disc similar to the substrate 1 Ts bonded thereon by a bonding agent as the protective material 6, thereby to form the optical recording medium having the construction as in FIG. 1. Upon measurement of the optical constants of ZnS—$SiO_2$ and Al, results as shown in Table 2 below were obtained.

TABLE 2

| (Optical constants of ZnS—$SiO_2$ and Al) | | |
|---|---|---|
| Wavelength (nm) | ZnS—$SiO_2$ | Al |
| 830 | 2.1 | 2.0 + 7.1i |
| 650 | 2.1 | 1.2 + 6.6i |
| 400 | 2.1 | 0.5 + 4.0i |

From the data of Tables 1 and 2, by calculating the entire reflectance factor and absorption upon variation of the film thickness of each layer, optimum film thickness at each wavelength can be obtained. The calculation was effected by the matrix method based on the complex refractive index and film thickness of each layer (For example, the method as described in a book "Wave optics" by H. KUBOTA, published by Iwanami shoten in 1971, Chapter 3). Meanwhile, the substrate 1 and protective material 6 are assumed to have an infinite film thickness (with effects "substrate—air interface", and "close contact protective layer—air interface" being neglected), while the reflectance R was obtained as a ratio of the light intensity incident upon from the base material, to the light intensity reflected and outgoing into the base material. Meanwhile, the absorption can be obtained by the incomings and outgoings of light energy at each interface.

Figure 2:
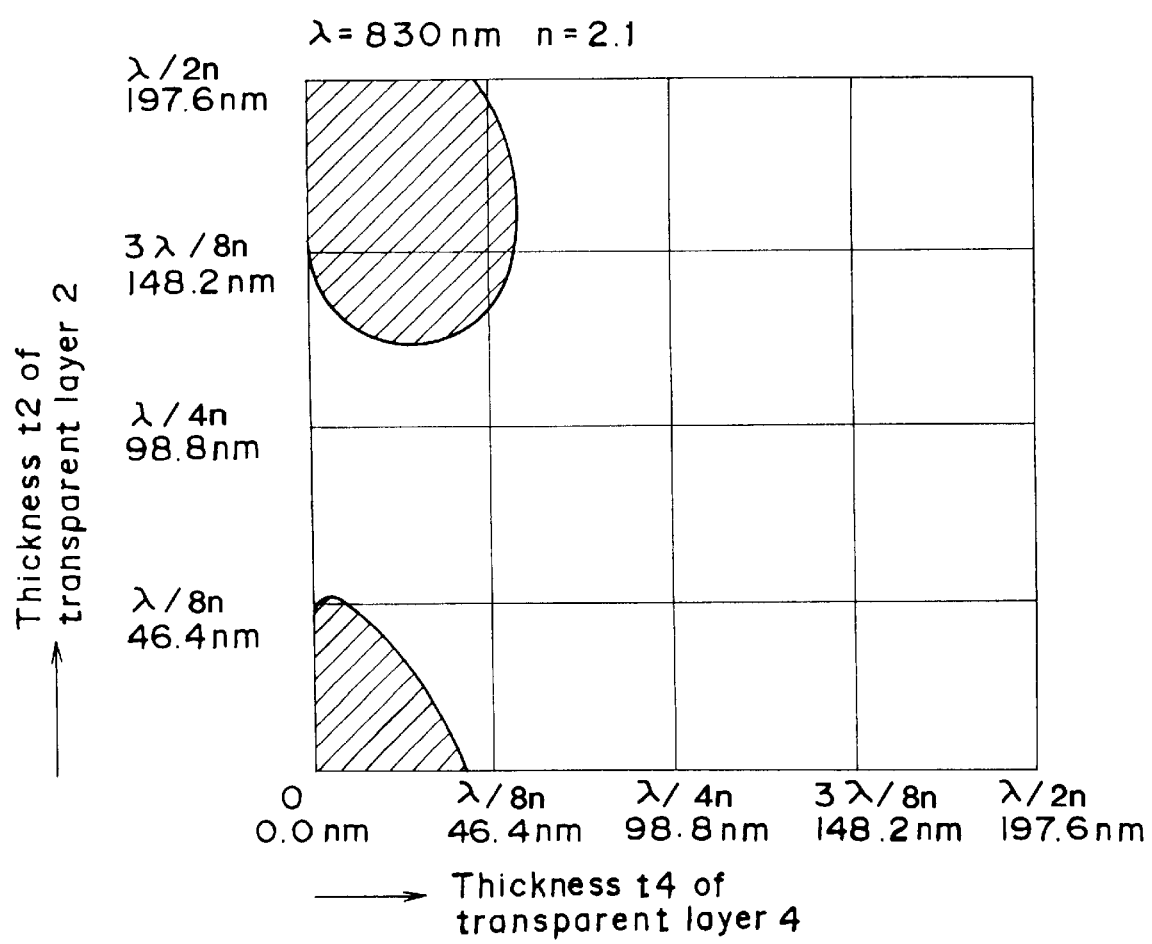
FIG. 2 is a graphical diagram for explaining a region of a transparent film thickness favorable in the optical characteristics with large absorption and large reflectance factor at a wavelength of 830 nm in the embodiment of the optical information recording medium of the present invention.
Figure 3:
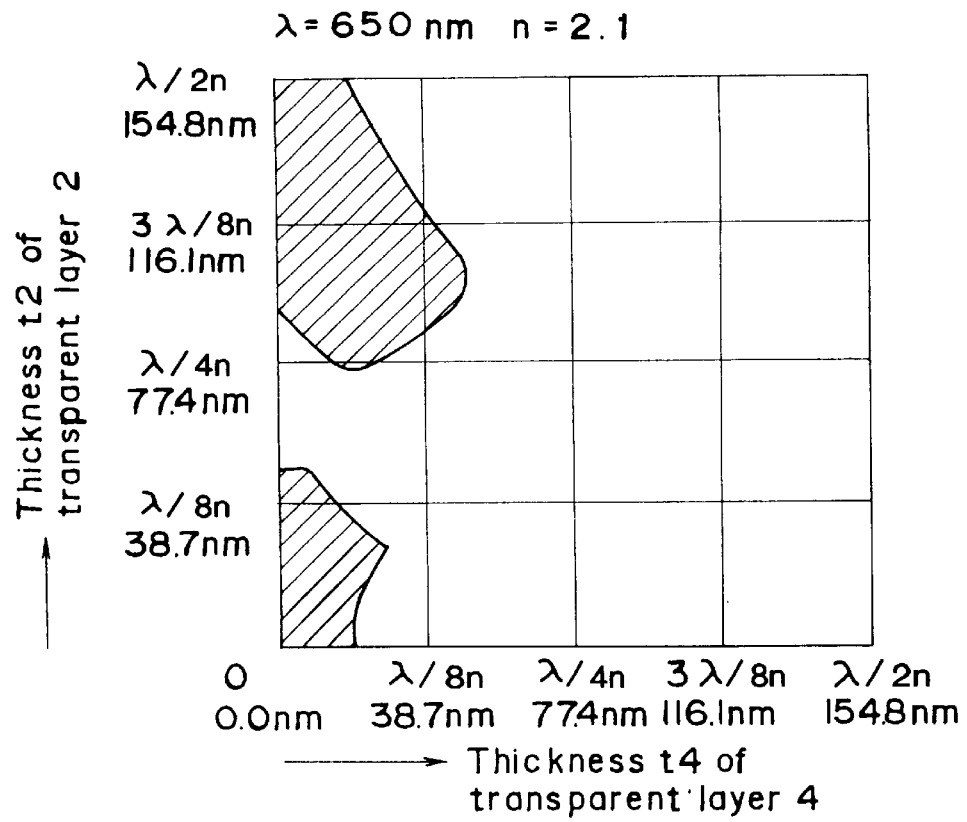
FIG. 3 is also a graphical diagram for explaining a region of a transparent film thickness favorable in the optical characteristics with large absorption and large reflectance factor at a wavelength of 650 nm in the embodiment of the optical information recording medium of the present invention.
Figure 4:
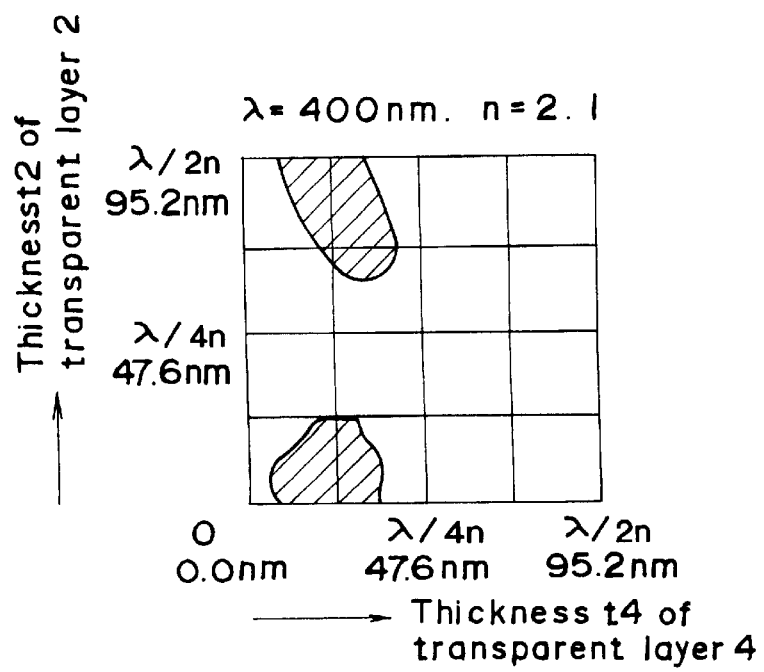
FIG.4 is also a graphical diagram for explaining a region of a transparent film thickness favorable in the optical characteristics with large absorption and large reflectance factor at a wavelength of 400 nm in the embodiment of the optical information recording medium of the present invention.

As one example, calculation was effected in the case where the thickness t3 of the recording thin layer 3 was 20 nm, and the thickness t5 of the reflection layer 5 was 50 nm. FIGS. 2 shows the optimum region of thicknesses for the transparent layers 2 and 4 at the wavelength 830 nm. In FIG. 2, the ordinate represents the thickness t2 of the transparent layer 2, while the abscissa denotes the thickness t4 of the transparent layer 4. As described earlier, since the optical characteristic of the transparent layer is equivalent to the optical length (thickness×refractive index) of the transparent layer at a cycle of λ/2, FIG. 2 shows the optical length up to λ/2 both in the ordinate and abscissa. Scales for the ordinate and abscissa show the optical length and the absolute value simultaneously. Hatched portions in FIG. 2 shows regions in which the variation of reflection factors when the recording film varies from the amorphous state to the crystalline state is above 20%, and the absorption both in the amorphous state and crystalline state is above 60%. Similarly, FIGS. 3 and 4 show the optimum regions of thicknesses for the transparent layers 2 and 4 at the wavelengths of 650 nm and 400 nm.

At the wavelength 830 nm, the portion centering the regions where the thickness t2 of the transparent layer 2 is equivalent to 15λ/32 (about 185 nm) and the thickness t4 of the transparent layer 4 is equivalent to λ/16 (about 25 nm), are the optimum regions having a large absorption, with a large variation in the reflectance. In this case, this region where the periodicity of the cycle of λ/2 for the thicknesses t2 and t4 is taken into consideration, may be said to be the region centering at the point shown in an equation (2) given below.

$$(t2, t4) = (m_1\lambda/2 - \lambda/32, l_1\lambda/2 + \lambda/16) \text{ optical length}$$
$$= (m_1\lambda/2n - 12 \text{ nm}, l_1\lambda/2n + 25 \text{ nm}) \text{ absolute value}$$

where $\lambda = 830$ nm, $n=2.1$ $m_1$, $l_1$ are integers in the relation of $m_1>0$, $l_1 \geq 2$)

Similarly, for the wavelength 650 nm also, from FIG. 3, the regions where the thickness t2 of the transparent layer 2 is equivalent to 7λ/16 (about 135 nm) and the thickness t4 of the transparent layer 4 is equivalent to 3λ/32 (about 29 nm), are the optimum regions having a large absorption, and a large variation in the reflectance factor variation. In this case also, by taking the periodicity into account, the region may be represented by an equation (3) as given below.

$$(t2, t4) = (m_2\lambda/2 - 3\lambda/32, l_2\lambda/2 + 3\lambda/32) \text{ optical length}$$
$$= (m_2\lambda/2n - 29 \text{ nm}, l_2\lambda/2n + 23 \text{ nm}) \text{ absolute value.}$$

where $\lambda = 650$ nm, $n=2.1$ $m_2$, $l_2$ are integers in the relation of $m_2>0$, $l_2 \geq 3$)

When the wavelength is of 400 nm, the optimum regions where the absorption is large, with a large reflectance variation are those in which the thickness t2 is equivalent to 7λ/16 (about 83 nm), and the thickness t4 is equivalent to λ/8 (about 24 nm) as is seen from FIG. 4, and such region may be represented by a following equation (4).

$$(t2, t4) = (m_3\lambda/2 - \lambda/16, l_3\lambda/2 + \lambda/8) \text{ optical length}$$
$$= (m_3\lambda/2n - 12 \text{ nm}, l_3\lambda/2n + 24 \text{ nm}) \text{ absolute value}$$

where $\lambda = 400$ nm, $n=2.1$ $m_3$, $l_3$ are integers in the relation of $m_3>0$, $l_3 \geq 4$)

As is clear from the above equations 2, 3 and 4, although the absolute values differ according to the wavelengths, it is seen that the optimum regions are in the vicinity of integral multiple of the optical length λ/2 in any of the cases, and the differences from the integral multiples of λ/2 are almost equal to each other. Therefore, by properly selecting factors m and λ representing integral multiples, it is possible to obtain a medium having favorable characteristics in the respective wavelengths in the region where the absolute values are approximately equal with respect to different wavelengths.

By way of example, when the relation is set to $m_1=3$, and $l_1=0$ at the wavelength 830 nm, the film thicknesses will become t2=582 nm and t4=24 nm, and if the relation of $m_2=4$, and $l_2=0$ is selected at the wavelength 650 nm, the film thicknesses will be t2=591 nm, and t4=29 nm. Since any of the regions has an allowance of more than ±10 nm, the points for t2=585 nm, and t4=25 nm satisfy both conditions, and it is expected to show favorable characteristics both at the wavelengths of 830 nm and 650 nm.

For another example, when the relation is set at $m_1=1$ and $l_1=0$ at the wavelength of 830 nm, the film thicknesses will be t2=185 nm and t4=24 nm, and upon selection of $m_3=2$ and $l_3=0$ at the wavelength of 400 nm, the thickness will become t2=178 nm and t4=29 nm. The points for t2=180 nm and t4=25 nm satisfy the conditions for the both. Similarly, the thicknesses t2=180 nm and t4=220 nm corresponding to $m_1=1, l_1=1, m_3=2$ and $l_3=2$ also satisfy the conditions for the both.

Anyway, in general, the optical information recording medium having the transparent layer film thickness d as represented by the equation (1) can give favorable characteristics with respect to two different wavelengths.

As described earlier, in the phase-change recording medium, the thickness of the transparent layer 4 will strongly affect the thermal conditions of the recording medium. In order to obtain the quenching conditions for the amorphous state formation, it is necessary to make the film thickness of the transparent layer 4 as thin as possible. As shown in FIGS. 2, 3 and 4, when the film thickness of the second transparent layer is sufficiently small with respect to the optical length $\lambda/2$, the condition l=O may be used for any wavelength. Therefore, in this case, the condition of the equation (1) may be satisfied only in the film thickness of the first transparent layer 2. Thus, the medium which gives favorable characteristics with respect to the different wavelengths without impairing the quenching conditions of the medium can be obtained.

Based on the foregoing results, the following experiments were carried out.

A polycarbonate resin plate of 1.2 mm thick and 200 mm in diameter (PC, refractive index: 1.58) preliminarily formed with groove tracks of 0.6 82 m wide and 65 nm deep was prepared as the substrate, and on the substrate, a mixed dielectric material of zinc sulfide and silicon dioxide (ZnS-SiO$_2$) was deposited to t2=585 nm in thickness by the electron beam deposition method as the transparent layer 2. On the transparent layer 2, a recording thin film Ge$_2$Sb$_2$Te$_5$ was formed to t3=20 nm in thickness by the similar method as above for the recording thin layer 3, with ZnS-SiO$_2$ being further deposited thereon by the similar method to t4=25 nm in thickness as the transparent layer 4. On the transparent layer 4, aluminum (Al) layer was formed by an electron beam deposition method to a thickness of t5=50 nm as the reflection layer 5. Furthermore, a PC disc similar to the substrate 1 bonded thereon by a bonding agent as the protective material 6, thereby to form the optical recording medium.

With the recording medium thus prepared being rotated, at a linear velocity of 10 m/sec., laser-diode light of the wavelength at 830 nm was converged by a lens system with a numerical aperture of 0.5 and focused onto the surface of the recording thin film for irradiation by applying tracking control to the groove tracks. In the first place, the laser light was irradiated on the recording thin film surface at a continuous output of 8.5 mW, and thus, the recording thin film on the tracks was uniformly crystallized. Onto the tracks, the laser light at the output of 19 mW on the recording film surface (recording power), and modulated at the single frequency 5 MHz with the modulation duty of 50% was projected, so as to partially form the recording thin film into the amorphous state, thereby forming the marks for recording. Moreover, when a continuous output (reproducing power) of 1 mW was irradiated, and the reflection light thereof was detected by a photo-detector for reproduction, the amount of the reflection light was reduced to about ⅓ at a recording mark portion, and the reproduction signal of 5 MHz could be obtained. Upon measurement of the reproduction signal by a spectrum analyzer, CN ratio 56 dB (frequency resolution band width 30 KHz: same condition hereinafter) was obtained. On to these tracks, laser light was projected at a continuous output of 8.5 mW on the recording thin film surface, and the recorded amorphous state mark was crystallized for erasing. Under the above state, when the reproduction signal was measured by the same reproducing power, a CN ratio 31 dB was obtained as the frequency component of 5 MHz. In other words, unerased signal of 31 dB was observed. When a difference between the CN ratio of the reproduction signal in the recording state and the unerased reproduction signal in the erased state is defined as an erasing factor, said erasability will become 25 dB in this case.

Furthermore, onto the above medium, at a linear velocity of 10 m/sec., laser diode of the wavelength at 650 nm was converged by a lens system with a numerical aperture of 0.5 and focused onto the surface of the recording thin film for irradiation by applying tracking control to the groove tracks. Onto the tracks, the laser light at the output of 16 mW on the recording film surface (recording power), and modulated at the single frequency 6.5 MHz with the modulation duty of 50% was projected, so as to partially form the recording thin film into the amorphous state, thereby forming the marks for recording. Moreover, when a continuous output (reproducing power) of 1 mW is irradiated, and the reflection light thereof is detected by a photo-detector for reproduction, the amount of the reflection light was reduced to about ¼ at a recording mark portion, and the reproduction signal of 6.5 MHz could be obtained. Upon measurement of the reproduction signal by a spectral analyzer, CN ratio 50 dB was obtained.

Moreover, when the above tracks recorded by the wavelength 830 nm were reproduced by the reproduction light of the wavelength 650 nm, reproduction signal of 5 MHz at CN ratio 52 dB was obtained. Meanwhile, upon reproduction of the tracks recorded at the wavelength of 650 nm by the reproduction light of the wavelength of 830 nm, reproduction signal of 6.5 MHz at CN ratio 50 dB was obtained.

In another embodiment, as the substrate 1, a polycarbonate resin plate of 1.2 mm thick and 200 mm in diameter preliminarily formed with groove tracks of 0.6 μm wide and 65 nm deep was prepared, and on this base material, a mixed dielectric material of zinc sulfide and silicon dioxide (ZnS-SiO$_2$) is deposited to t2=180 nm in thickness by the electron beam deposition method as the transparent layer 2. On the transparent layer 2, a recording thin film Ge$_2$Sb$_2$Te$_5$ was formed to t3=20 nm in thickness by the similar method as above for the recording thin layer 3, with ZnS-SiO$_2$ being further deposited thereon by the similar method to t4=25 nm in thickness as the transparent layer 4. On the transparent layer 4, aluminum (Al) layer was formed by the electron beam deposition method to a thickness of t5=50 nm as the reflection layer 5. Furthermore, a polycarbonate disc similar to the substrate 1 was bonded thereon by a bonding agent as the protective material 6, thereby to form the optical recording medium.

With the above recording medium being rotated, at a linear velocity of 10 m/sec., laser diode light of the wavelength at 830 nm was converged by a lens system with a numerical aperture of 0.5 and focused onto the surface of the recording thin film for irradiation by applying tracking control to the groove tracks. In the first place, the laser light was irradiated on the recording thin film surface at a continuous output of 12 mW, and thus, the recording thin film on the tracks was uniformly crystallized. Onto the tracks, the laser light at the output of 20 mW on the recording film surface (recording power), and modulated at the single frequency 5 MHz with the modulation duty of 50% was projected, so as to partially form the recording thin film into the amorphous state, thereby forming the marks for recording. Moreover, when a reproducing power of 1 mW was irradiated, and the reflection light thereof was detected by a photo-detector for reproduction, the amount of the reflection light was reduced to about ⅓ at a recording mark portion, and the reproduction signal of 5 MHz could be obtained. Upon measurement of the reproduction signal by a spectrum analyzer, CN ratio 57 dB was obtained. Onto the tracks, the laser light at the recording power of 20 mW on the recording film surface, and modulated at the single frequency 10 MHz with the modulation duty of 30% was projected, so as to partially form the recording thin film into the amorphous state, thereby forming the marks for recording. Upon reproduction of the signal by the reproduction light of 1 mW, CN ratio was 42 dB, because of insufficient resolving power due to a large beam diameter of the reproduction light as compared with the recording mark.

When the tracks recorded with the signal of 10 MHz were subjected to reproduction by the beam obtained by converging the laser light using secondary harmonic wave generating element of a wavelength at 410 nm, through a lens system having the numerical aperture of 0.5, the reproduction signal of 49 dB sufficient for actual applications were obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical information recording medium capable of both recording and reproducing with each of a plurality of laser light wavelengths which comprises:

a substrate;

a recording thin film layer provided on said substrate and adapted to form variation in an amount optically detectable by absorbing at least laser light so as to record information by partially varying said recording thin film layer and to reproduce the information by optically detecting the variation amount; and a transparent layer means provided in contact with said recording thin film layer, said transparent layer means having an optical thickness d which is a product of a physical thickness t and a refractive index n, wherein said optical thickness is selected such that, at wavelengths $\lambda_1$ of 400 nm and $\lambda_2$ of 650 nm, the value of the optical thickness provides more than 60% in light absorption and more than 20% in reflectance factor variation for both wavelengths $\lambda_1$ and $\lambda_2$ such that both wavelengths $\lambda_1$ and $\lambda_2$ can be used for both recording and reproducing.

2. An optical information recording medium as claimed in claim 1, wherein the optically detectable amount is of a reflectance factor variation, wherein said transparent layer means has one of optical thickness d1 and optical thickness d2 for wavelengths $\lambda_1$ and $\lambda_2$ respectively such that:

$d=t\times n=d1+(\lambda_1/2)\times m=d2+(\lambda_2/2)\times 1$ (where m, l: positive integer or zero).

3. An optical information recording medium as claimed in claim 2, wherein said recording medium thin film layer is made of a material subjected to phase-change by the laser irradiation, thereby to vary in its optical constant.

4. An optical information recording medium capable of both recording and reproducing with each of a plurality of laser light wavelengths which comprises:

a substrate, a first transparent layer having a refractive index different from that of said base material and provided on said base material, a recording thin film layer provided on said first transparent layer and adapted to optically vary by absorbing a laser light, a second transparent layer further provided on said recording thin layer, and a reflection layer provided on said second transparent layer, said first transparent layer having an optical thickness d which is a product of a physical thickness t and a refractive index n, wherein said optical thickness is selected such that, at wavelengths $\lambda_1$ of 400 nm and $\lambda_2$ of 650 nm, the value of the optical thickness provides more than 60% in light absorption and more than 20% in reflectance factor variation for both wavelengths $\lambda_1$ and $\lambda_2$ such that both wavelengths $\lambda_1$ and $\lambda_2$ can be used for both recording and reproducing.

5. An optical information recording medium as claimed in claim 4, wherein the optically detectable amount is of a reflectance factor variation, wherein said first transparent layer has respective optimum optical thickness d1 and optical thickness d2 for wavelengths $\lambda_1$ and $\lambda_2$ respectively such that:

$d=t\times n=d1+(\lambda_1/2)\times m=d2+(\lambda_2/2)\times l$ (where m, l: positive integer and zero).

6. An optical information recording medium as claimed in claim 5, wherein an optical thickness of said second transparent layer is sufficiently small with respect to both of the different wavelengths $\lambda 1$ and $\lambda 2$ such that it does not substantially affect the optical characteristic.

7. An optical information recording/reproducing method capable of both recording and reproducing with each of a plurality of laser light wavelengths, which comprises the steps of:

recording information by causing at least laser light to be absorbed in an optical information recording medium including a recording thin film layer provided on a substrate, thereby partially varying said recording thin film layer, and reproducing the information by optically detecting the amount of variation, said recording/reproducing method further including steps of preparing laser light sources of two different wavelengths $\lambda_1$ and $\lambda_2$, and effecting the recording and/or reproducing by employing the laser light of the different wavelengths $\lambda_1$, $\lambda_2$, onto the optical information recording medium in which there is provided a transparent layer means having an optical thickness which is a product of a physical thickness and a refractive index, wherein said optical thickness is selected such that, at least for any two different wavelengths $\lambda_1$ and $\lambda_2$ selected from the group of 400 nm, 650 nm and 830 nm, the value of the optical thickness provides a large laser light absorption and a large reflectance factor variation amount at wavelength $\lambda_1$ and the value of the optical thickness also provides a large laser light absorption and a large reflectance factor variation amount at wavelength $\lambda_2$, said optical thickness of said transparent layer means providing more than 60% in light absorption and more than 20% in reflectance factor variation for both wavelengths $\lambda_1$ and $\lambda_2$ such that both wavelengths $\lambda_1$ and $\lambda_2$ can be used for both recording and reproducing.

8. An optical information recording/reproducing method as claimed in claim 7, wherein said transparent layer means has respective optimum optical thickness d1 and optical thickness d2 for wavelengths $\lambda_1$ and $\lambda_2$ respectively such that:

$$d = t \times n = d1 + (\lambda_1/2) \times m = d2 + (\lambda_2/2) \times l \text{ (where } m, l: \text{ positive integer and zero)}.$$

9. An optical information recording medium comprising:

a substrate made of polycarbonate, a first transparent layer, provided on said substrate, having a refractive index n=2.1 and different from that of said substrate, a recording thin film layer of $Ge_2Sb_2Te_5$ provided on said first transparent layer and adapted to optically vary between amorphous state and crystalline state by absorbing a laser light, a second transparent layer, provided on said recording thin film layer, having a refractive index n=2.1, and a reflection layer made of aluminum and provided on said second transparent layer, said first transparent layer having optical thickness equal to t2 (physical thickness)×n, and said second transparent layer having optical thickness equal to t4 (physical thickness)×n by which, in two different wavelengths $\lambda 1=830$ nm and $\lambda 2=400$ nm, a value obtained by adding integral multiples of $\lambda\frac{1}{2}$ to the optical thickness provides a large laser light absorption and a large variation amount at the wavelength $\lambda 1$, and a value obtained by adding integral multiples of $\lambda\frac{3}{2}$ to the optical thickness provides a large laser light absorption and large variation amount at the wavelength $\lambda 2$, said first transparent layer having a physical thickness t2 of 180±10 nm, and said second transparent layer having a thickness t4 of 220±10 nm.

* * * * *